United States Patent [19]
Stewart

[11] 3,830,457
[45] Aug. 20, 1974

[54] ANCHORING APPARATUS
[76] Inventor: Ned L. Stewart, 2816 Blue Ridge, Mesquite, Tex. 75149
[22] Filed: Oct. 19, 1972
[21] Appl. No.: 298,861

[52] U.S. Cl............................. 248/361 A, 52/155
[51] Int. Cl........................... E06b 3/54, E04b 5/52
[58] Field of Search............. 248/361 A, 361 R, 25; 52/155, 156, 157, 158, 159, 160, 161, 165, 23; 24/265 CD, 269, 68 CD, 68 B

[56] References Cited
UNITED STATES PATENTS
| | | | |
|---|---|---|---|
| 269,018 | 12/1882 | Crowell et al. | 52/23 |
| 2,932,871 | 4/1960 | Phillips et al. | 24/136 |
| 2,997,761 | 8/1961 | Davis | 248/361 A X |
| 3,075,252 | 1/1963 | King | 52/157 X |
| 3,290,743 | 12/1966 | Hanson | 248/361 A X |

FOREIGN PATENTS OR APPLICATIONS
| | | | |
|---|---|---|---|
| 38,208 | 4/1931 | France | 24/269 |
| 823,336 | 11/1952 | Germany | 52/155 |
| 867,153 | 10/1941 | France | 52/155 |

*Primary Examiner*—J. Franklin Foss
*Attorney, Agent, or Firm*—Richards, Harris & Medlock

[57] ABSTRACT
Disclosed is an anchoring apparatus for use in anchoring structures to the ground by use of elongated flexible straps. The anchoring apparatus has a lower ground engaging portion for attaching the apparatus to the ground; a threaded shaft extending from the lower portion; and an upper portion attached to the threaded shaft for attaching the straps to the apparatus. In one embodiment, the upper portion is provided with one or more heads, each of which has first and second flanges which extend at an angle with respect to each other. One of these flanges is provided with a bore through which the head is attached to the shaft by means of a threaded fastener. The other of these flanges is provided with means for attaching a strap thereto. In this embodiment, the attachment means comprise an elongated slot in the other flange with a flat-sided bar attached to extend across the slot. In another embodiment, a round knurled pin is used in place of the flat-sided bar. In a third embodiment, two parallel elongated slots are provided in the second flange. In a fourth embodiment, the upper portion is U-shaped and is attached to the shaft at its base and is held in place by a threaded fastener. At least one pair of aligned bores is provided in the parallel legs of the U-shaped upper portion. A flat-sided pin is positioned in each of the bores. Each of the bores is provided with a protrusion which will prevent rotation of the pin in one direction. A clamp is provided on the pin for attaching the strap thereto.

2 Claims, 13 Drawing Figures

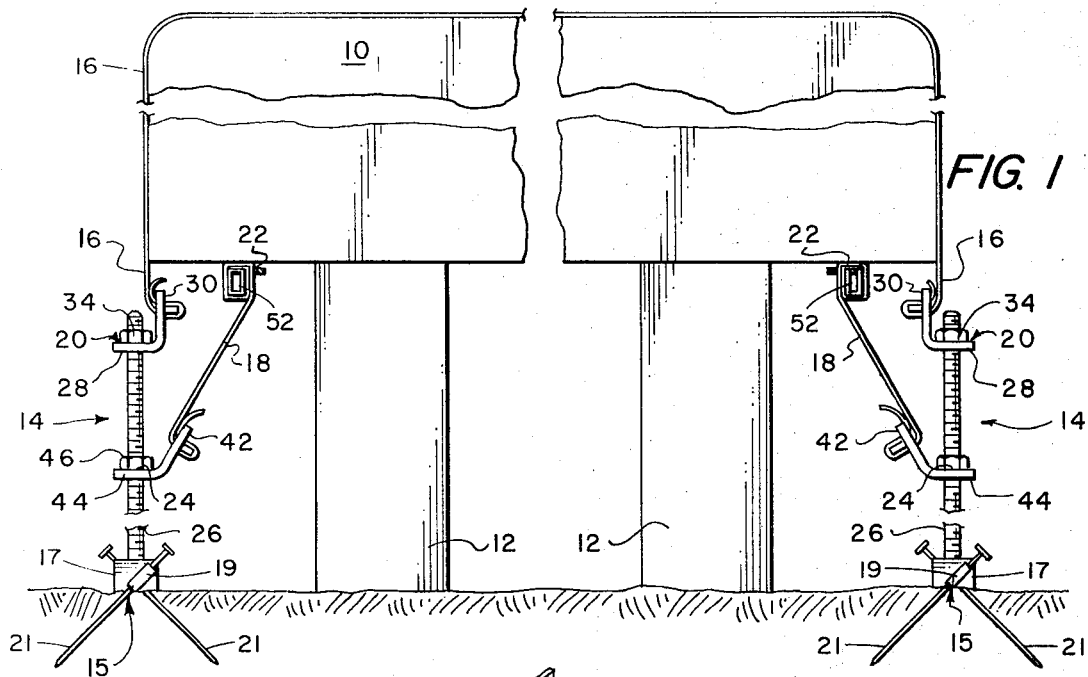
FIG. 1
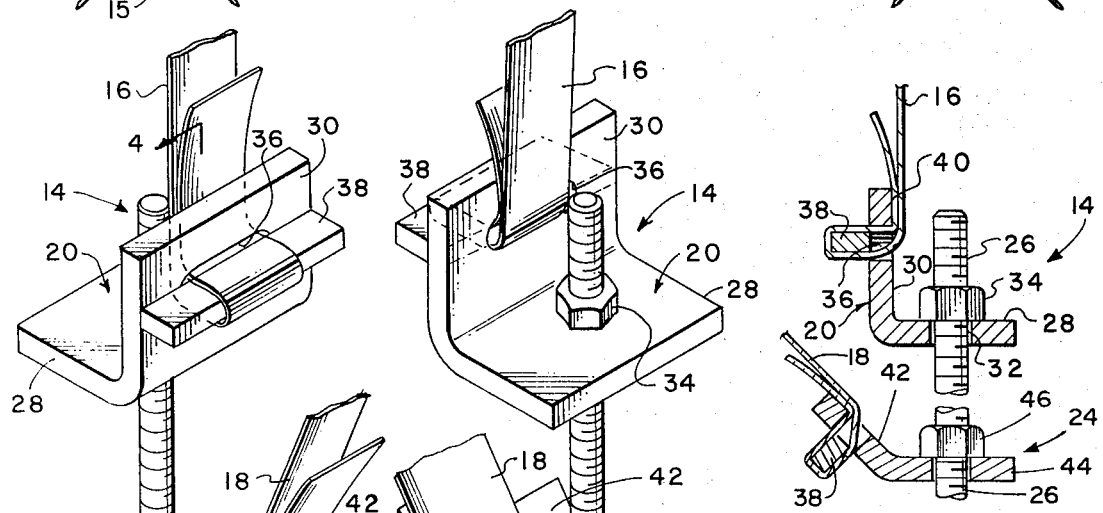
FIG. 4
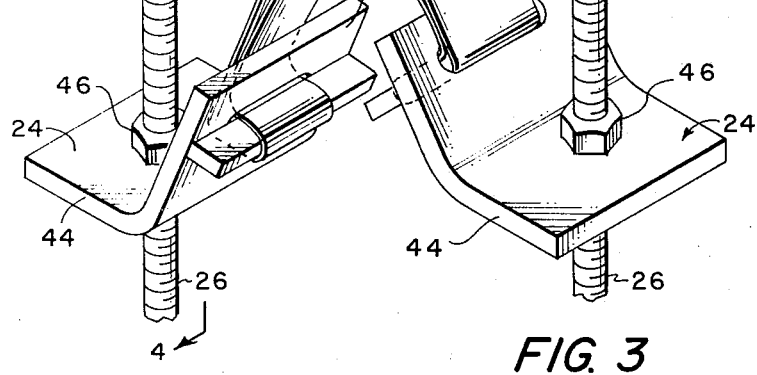
FIG. 2
FIG. 3

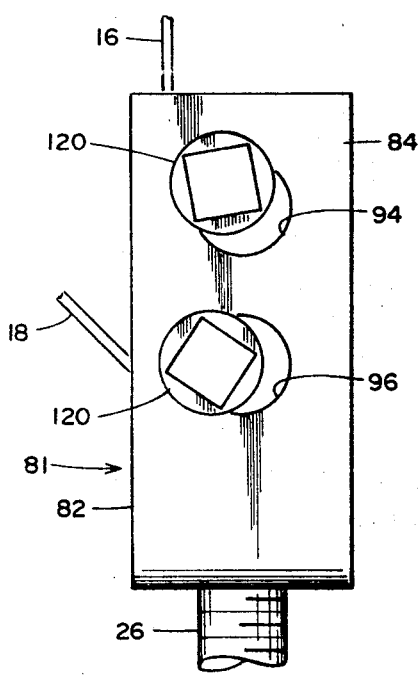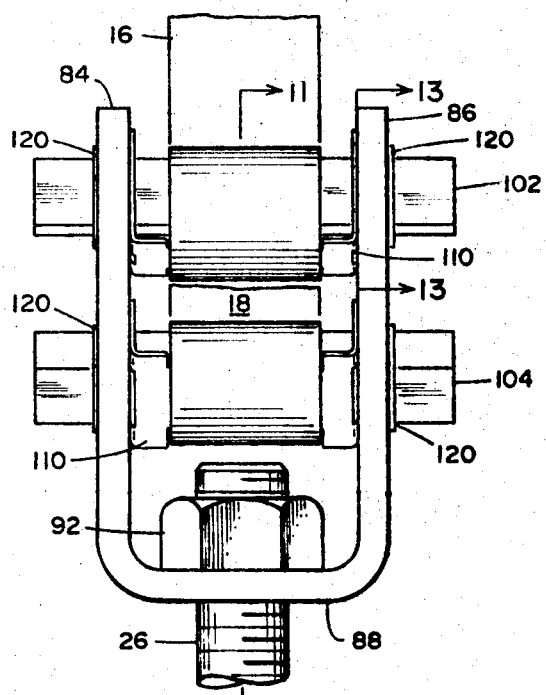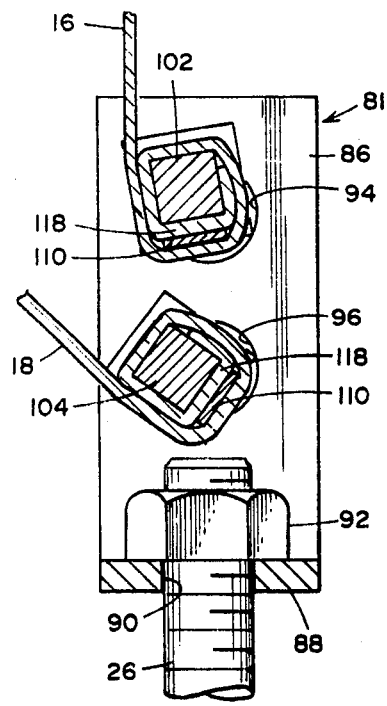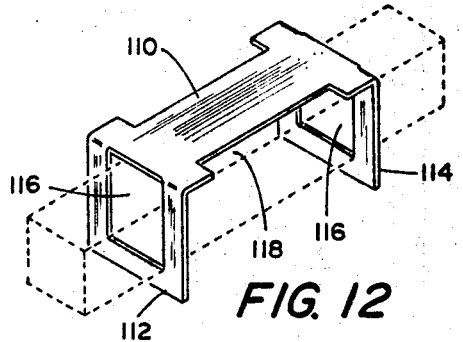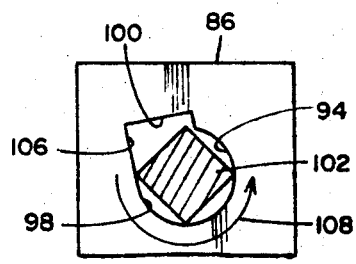
FIG. 9
FIG. 10
FIG. 11
FIG. 12
FIG. 13

3,830,457

ANCHORING APPARATUS

BACKGROUND OF THE INVENTION

The present invention relates to improvements in apparatus used to anchor structures and the like, and more particularly to a new and improved anchoring apparatus wherein a plurality of tensioning straps can be releasably attached to an anchor and wherein each of the straps can be individually tensioned as desired.

In the installation of structures such as mobile homes, portable buildings and the like, it has been a common practice to anchor these structures in place for purposes of safety. To accomplish this, anchoring apparatus are embedded in the ground and the structures are attached to these apparatus by means of flexible metal straps or the like. Although these systems have operated to effectively hold such structures in place, considerable difficulty has been experienced in attaching the straps to the anchor and the subsequent tensioning of the straps.

The general purpose of the present invention is to provide an improved anchoring apparatus which has all the advantages of similarly employed prior art anchoring apparatus and heads, yet provides an improved apparatus in which the straps can be individually tensioned as desired. To attain this, the present invention contemplates the use of a combination of an improved anchorhead with means for independently attaching a plurality of straps and the like thereto and an improved anchor with means for allowing the attachment of these improved anchorheads thereto and for individually tensioning the straps attached to each head.

OBJECTS OF THE INVENTION

An object of the present invention is the provision of an improved anchoring apparatus.

Another object of the present invention is the provision of an improved anchoring apparatus to which a strap can be simply and easily attached.

A further object of the present invention is to provide an improved anchoring apparatus in which the tension forces in the straps can be easily adjusted.

Yet another object of the present invention is the provision of an improved anchoring apparatus in which a plurality of straps can be attached to the apparatus and can be independently tensioned.

Still another object of the present invention is the provision of an improved anchoring apparatus which is simple and inexpensive to install and manufacture.

Other objects and many of the attendant advantages of the present invention will be readily understood by those of ordinary skill in the art as the same becomes better understood by reference to the following detailed description when considered in connection with the accompanying drawings, in which:

BRIEF DESCRIPTION OF THE DRAWINGS

FIG. 1 is a partial elevational view of one end of an object resting on foundation blocks and anchored in place by an improved anchoring apparatus of the present invention thereon;

FIG. 2 is an enlarged rear perspective view of the device shown in FIG. 1;

FIG. 3 is an enlarged front perspective view of the device shown in FIG. 1;

FIG. 4 is a partial section of the device taken on line 4—4 of FIG. 2, looking in the direction of the arrows;

FIG. 9 is a side elevation view of a fourth embodiment of the improved anchoring apparatus of the present invention;

FIG. 10 is a front elevation view of the device illustrated in FIG. 9;

FIG. 11 illustrates a partial section of the device taken on line 11—11 of FIG. 10 looking in the direction of the arrows;

FIG. 12 is a perspective view of the strap clamp used to attach the strap to the anchor; and FIG. 13 is a section of the device taken on line 13—13 of FIG. 10, looking in the direction of the arrows.

DESCRIPTION OF THE PREFERRED EMBODIMENT

Figure 5:
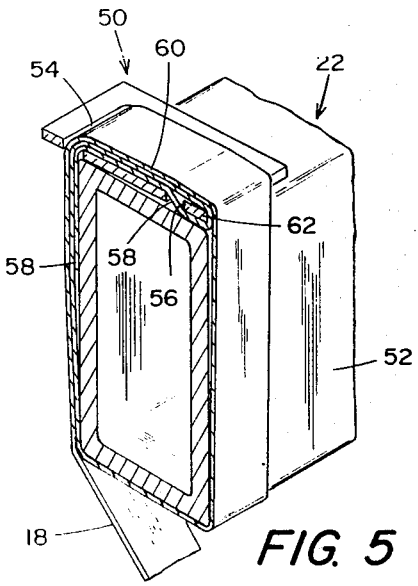
FIG. 5 illustrates a partial section of the frame of the structure showing the attachment of the strap thereto.

Referring now to the drawings wherein like reference characters designate like or corresponding parts throughout the several views there is shown in FIG. 1 a typical portable building structure 10 which is supported on foundation blocks 12 and is anchored in place by anchoring apparatus assemblies 14 and straps 16 and 18. In FIG. 1 a system for anchoring a structure is shown with straps 18 attached to the frame of the structure and strap 16 attached between two separate anchoring assemblies 14 and passing over the top of the structure. For purposes of the description of this invention, the anchor assembly is shown anchoring a portable building structure 10. It is to be understood, of course, that the anchor assembly could be used to anchor other types of structures such as mobile homes, camp trailers, airplanes, portable signs and the like.

The lower portion 15 of the anchoring apparatus assembly 14 is embedded in the ground and is shown for purposes of illustration as being rotated 90° from its normal installed position. This lower portion 15 is constructed from a plate 17 which is rigidly attached to one end of an elongated threaded shaft 26. Guides 19 are attached on each side of the plate 17. The guides can be, as in the present embodiment, constructed from hollow tubing which is welded flush against the side of the plate at an angle with respect to the shaft 26. These guides 19 are of a size to receive drive pins 21 therein, which are in turn driven into the ground to attach the lower portion 15 to the ground.

Although two anchor assemblies are illustrated in FIG. 1 for anchoring the portable building 10, it is to be understood that more or less assemblies could be utilized as is dictated by the size of the structure to be anchored and the anticipated loads thereon.

As is shown in FIG. 1, each of the anchor assemblies are attached to the ground and have straps 16 and 18 attached thereto. In the present embodiment, strap 16 extends over the building 10 and is attached to both of the anchoring apparatus assemblies 14 by means of right angle anchorheads 20. The straps 18 have one end attached to the frame of building 10 at 22 and the other end attached to anchors 14 by anchorheads 24.

Figure 6:
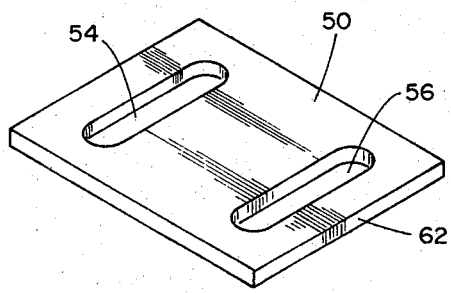
FIG. 6 is a perspective view of the strap buckle used to attach the strap to the frame of the structures.

This connection of the straps 18 to the frame at 22 utilizes a strap buckle 50 which is illustrated in detail in FIGS. 5 and 6. This strap buckle 50 is shown in FIG. 5 attaching the strap 18 to the frame member 52. The buckle 50 is shown in detail in FIG. 6 as comprising a flat rectangular-shaped plate with front or rear parallel elongated slots 54 and 56, respectively. To attach the strap 18 to the frame member 52, one end 58 of the strap 18 is inserted through the front slot 54. The other end 60 of the strap is then inserted through the rear slot 56, and wound around the extension 62, over the end 60 and is inserted through the front slot 54. The strap 18 is then wound around the frame member 52 over the buckel 50 and through the front slot 54, as shown.

Anchorheads 20 and 24 can be seen in detail in FIGS. 2, 3 and 4. The anchorhead 20 is provided with two flanges 28 and 30 which extend at right angles to each other. The flange 28 is provided with a clearance bore 32 through which the shaft 26 extends when the head 20 is attached to the anchor. A suitable fastener such as a hexagonal nut 34 is threaded onto the shaft 26 to hold the head 20 thereon. The other flange 30 is provided with a slot-like opening 36 of a size to allow the insertion of the strap 16 therethrough. Attached to the flange 30 adjacent the opening 36 is a flat-sided bar 38 which extends completely across one side of the opening 36 to divide the opening. By constructing the flange 30 in this manner the strap 16 can be inserted through the opening 36 around the bar 38 and back through the opening 36 to attach the strap to the head 20, as shown.

As can best be seen in FIG. 4, the relative length of the strap can be adjusted by correctly positioning the strap around the bar 38 until the strap 16 is tensioned. Thereafter, the initial tension in the strap will compress the loose end thereof at 40 and hold the same in position without the necessity of additional fasteners or clamps.

In a likewise manner, the anchorhead 24 is provided with two flanges 42 and 44 which intersect each other at an angle greater than 90° to accommodate the connection of the strap 18 to the frame member 52 of the building 10. The flange 42 is identical in construction to the flange 30 and the flange 44 is identical in construction to the flange 28. Strap 18 is attached to the head 24 in the same manner as strap 16 was attached to the head 20 and flange 44 is attached to shaft 26 by means of threaded fastener 46.

In operation, the anchoring apparatus assemblies 14 are first anchored to the ground adjacent the building 10 by means of drive pins 21. The heads 20 and 24 are then attached to shaft 26 by means of fasteners 34 and 46, respectively. The straps 18 are attached to the anchorheads 24 as previously described and the strap 16 is passed over the building 10 and attached to the anchorheads 20 in the same manner. Thereafter, the fasteners 34 and 46 are rotated to apply the desired amount of tension to each of the straps 16 and 18.

For purposes of description, the angles between the respective flanges of the anchorheads have been shown as two specific values. It is believed apparent, of course, that these angles could vary to accommodate various mounting situations in which the straps extend at other angles than are shown.

Figure 7:
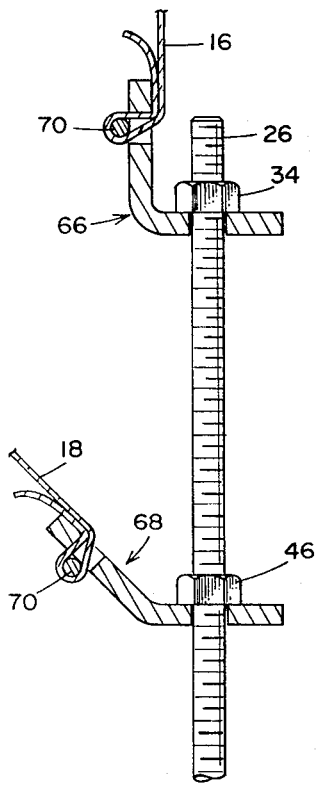
FIG. 7 is a sectional view similar to FIG. 4 of a second embodiment of the improved anchoring apparatus.

The bar 38 is shown as being of a rectangular shape. It is to be understood, of course, that other shapes could be used such as those shown in FIGS. 7 and 8. In FIG. 7, anchorheads 66 and 68 are shown. These heads 66 and 68 are identical in construction with anchorheads 20 and 24, respectively, except that knurled pins 70 are attached to the heads in place of bars 38 to attach the straps to the heads.

Figure 8:
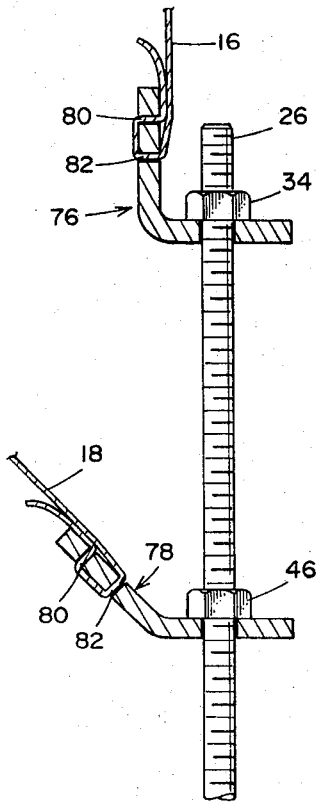
FIG. 8 is a sectional view similar to FIG. 5 of a third embodiment of the improved anchoring apparatus.

In FIG. 8, a third embodiment is shown with anchorheads 76 and 78. These heads 76 and 78 are identical in structure to heads 20 and 24, except that the bar 38 is removed and two elongated parallel slots 80 and 82 are provided in each of the heads. The straps are attached to the heads by inserting one end of each strap through the slot 82 and then through slot 80, as shown.

The straps in the configuration shown in FIGS. 7 and 8 are held in place and adjusted in tension as has been previously described with respect to the configuration shown in FIGS. 2 and 3.

Turning now to FIGS. 9, 10, 11, 12, and 13, another embodiment 81 of the anchorhead is shown attached to a shaft 26. This anchorhead 81 has a U-shaped body 83 with parallel extending spaced flanges 84 and 86, which are joined together by portion 88. The portion 88 is provided with a bore 90 which is sized to allow the shaft 26 to be inserted therethrough and attached to the head 81 by means of a threaded fastener 92. It is envisioned, of course, that other means of attaching the shaft 26 to the head 80 could be used such as welding or the like.

In the embodiment illustrated, each flange 84 and 86 is provided with aligned upper and lower irregular-shaped openings 94 and 96, respectively, extending therethrough. These irregular openings 94 and 96 are each identical in shape and are provided with a circular portion 98 and off set straight-sided notch portion 100 as shown in FIG. 13. Upper and lower straight-sided pins 102 and 104, respectively, are inserted through the upper and lower aligned irregular openings 94 and 96, respectively. The pins 102 and 104 are of such a size that they will rotate within the circular portion 98 of the openings 94 and 96. The pins are also of the size that they will slip into the notch portion 100 and will be prevented from rotating in a clockwise direction as seen in FIG. 9. One edge 106 of the notch portion 100 is tangent to the circular portion 98 so that the pin will be allowed to rotate in a counter-clockwise direction as shown by arrow 108 in FIG. 13.

Each of the pins 102 and 104 is provided with a strap clamp 110. This strap clamp 110 is shown in detail in FIG. 12 and has a U-shaped body with two parallel extending flanges 112 and 114, each of which is provided with a flat-sided opening 116. These openings 114 and 116 are of a size to receive the pin 104 therein. When the clamp 110 is mounted on the pin, a slot 118 is formed between the clamp 110 and one side of the pin. This slot 118 is of a size to allow the insertion of either the strap 16 or 18 therethrough for attaching the straps to the respective pins. Each of the pins 102 and 104 can be provided with portions 120 which are attached to the pins to hold the pins in axial position on the anchorhead 81.

The operation of the anchorhead 81 is as follows: First the pins 102 and 104 and the strap clamp 110 are assembled on the anchorhead 81. The anchorhead is then attached to the shaft 26 by fastener 92 once the anchor is embedded into the ground. Thereafter, one end of the straps 16 and 18 are attached respectively to pins 102 and 104 by inserting the same through the slots 118 formed between the respective pins and the strap clamps 110. Thereafter, a ratchet, wrench, or the like is utilized to engage one end of the pin 102 and rotate the same in the direction of arrow 108 to reel the strap 116 around the pin 102, thus tensioning the strap as desired. Once the desired amount of tension is attained in the strap 16, the wrench or ratchet is released from the end of the pin, thus allowing the pin to be pulled by the tension in the strap 16 up into the notch portion 100. The pin 102 will then be held in position against rotation in a clockwise direction. The above procedure is then repeated for pin 104 whereupon the anchorhead is attached to the straps 16 and 18. Thereafter, the fastener 92 can be adjusted to provide additional tension in the straps 16 and 18.

Obviously, many modifications and variations of the present invention are possible in light of the above teachings. It is therefore to be understood that within the scope of the appended claims the invention may be practiced by those of ordinary skill in the art other than as specifically described.

What is claimed is:

1. An apparatus for use in anchoring a pair of elongated metallic anchoring straps extending from a trailer or the like, comprising:

an anchor body having a plurality of inclined sockets, a plurality of separate elongated anchors extending through said sockets for engaging the ground, an elongated threaded shaft extending from said body; and an anchorhead comprising a body of rigid material, a plurality of shafts rotatably mounted on said body, means on each of said shafts for attaching one of said straps, and means for preventing rotation of each of said shafts in a first direction and for allowing rotation of said shafts in the reverse of said first direction whereby the initial tension in each of said straps can be independently adjusted, said body having an opening through which said threaded shaft extends, a threaded fastener means for axially positioning said head on said shaft whereby said straps can be further tensioned to the desired amount by adjusting said fastener.

2. The apparatus of claim 1 wherein each of said shafts additionally comprises:

means on each of said shafts for engagement and rotation of said shafts.

* * * * *